Figure 1:
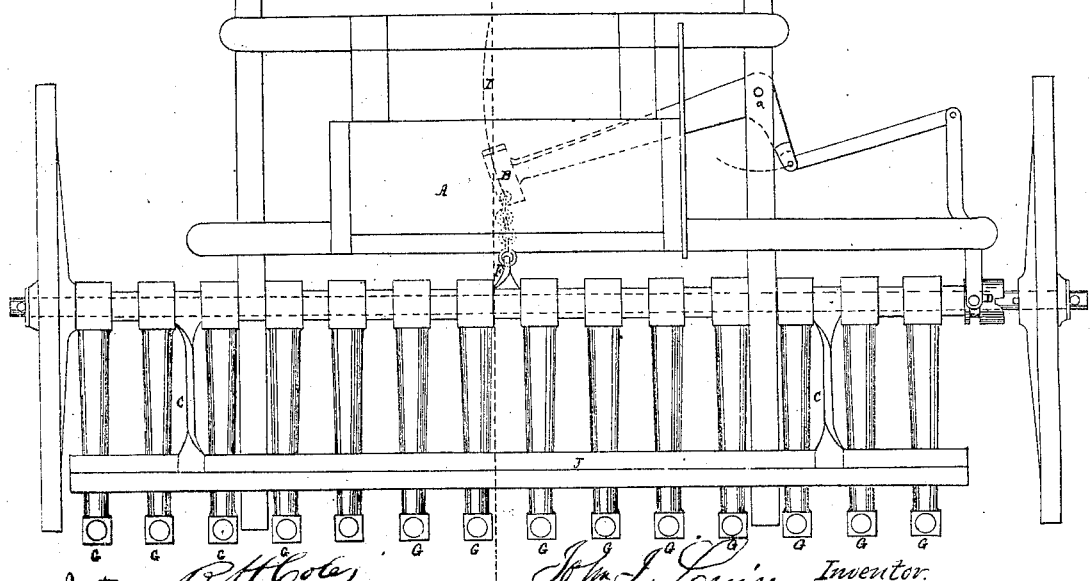

Sheet 1-2 Sheets.

J. J. Squire.
Horse Rake.

Nº 16318          Patented Dec. 23, 1856.

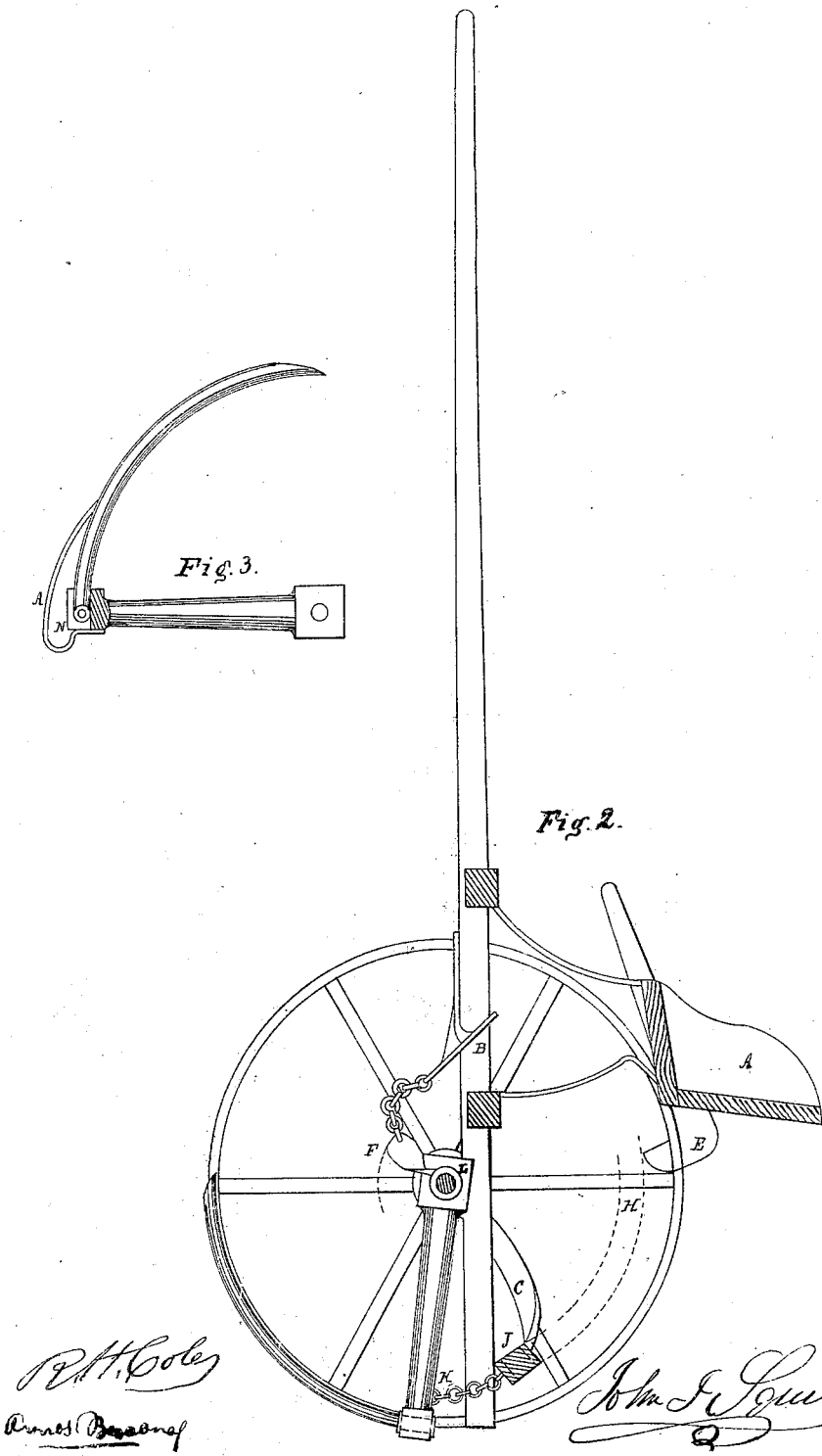

UNITED STATES PATENT OFFICE.

JOHN J. SQUIRE, OF ST. LOUIS, MISSOURI.

IMPROVEMENT IN HAY-RAKES.

Specification forming part of Letters Patent No. 16,318, dated December 23, 1856.

*To all whom it may concern:*

Be it known that I, JOHN J. SQUIRE, of the city of St. Louis, in the county of St. Louis and State of Missouri, have invented a new and useful Improvement on Harvest-Rakes, to be used in gathering hay or grain; and I do hereby declare that the following is a full and exact description of the same, reference being had to the accompanying drawings and the letters of reference marked thereon.

Figure 1 is a plan. Fig. 2 is a transverse section at X; and Fig. 3 is a plan of tooth and arm which I design using in connection with this machine, should it be found necessary.

The object of my invention is to place an efficient means under the control of the driver, by which the rake can be lifted from the ground and lowered again at pleasure by the power applied to draw it. To do this I place on the axle a clutch made to work on a feather at D, Fig. 1, and to mesh in a corresponding clutch on the wheel, as shown also at D. I connect a lever to this clutch and carry its end under the seat of the driver, as shown at B, Figs. 1 and 2, or in some other convenient place where the driver may have it under his control. I place on the axle at F an arm, and connect it to the end of the lever at B by means of the chain, shown also at B. This arm is secured to the axle so as to turn with it. The arms C C are also secured to the axle at one end and to the cross-bar J at the other, to which the arms G G G, &c., are suspended by a chain shown at K. The arms G G G, &c., are swung on the axle at L, so as to vibrate freely, and, being suspended at the other end and kept down merely by force of gravity, they can accommodate themselves to any irregularity on the surface of the ground.

Let the rake be in the position shown on the drawings, and let it be desired to raise the arms so that the rake shall discharge its load. The driver, sitting in the seat at A, puts his foot on the end of the lever B and throws it forward in the direction of the arc I, Fig. 1, which throws the clutch D in gear and causes the axle to turn with the wheels, so that the arms C C and their attachments are made to rise in the direction of the arc H, shown in red, Fig. 2. The arms C C having lifted far enough in the above-mentioned direction to discharge the rake of its load, the chain on the lever F acts on the lever B and detaches the clutch D, thus allowing the rake to fall back to its position on the ground.

If it is desired to keep the rake off from the ground, it is only necessary to catch it when it is raised up by the clutch under the hook-lever E, Fig. 2.

What I claim, and desire to secure by Letters Patent, is—

The clutch and levers operating the same, in combination with the arm F of the rake-shaft, and the connection between said arm and lever B, whereby the rake is lifted by the moving power and automatically released, substantially as specified.

JOHN J. SQUIRE.

Witnesses:
  R. H. COLE,
  AMOS BROADNAX.